Dec. 27, 1955   H. O. SUDBRINK   2,728,568
TYPE BAR
Filed Sept. 1, 1951
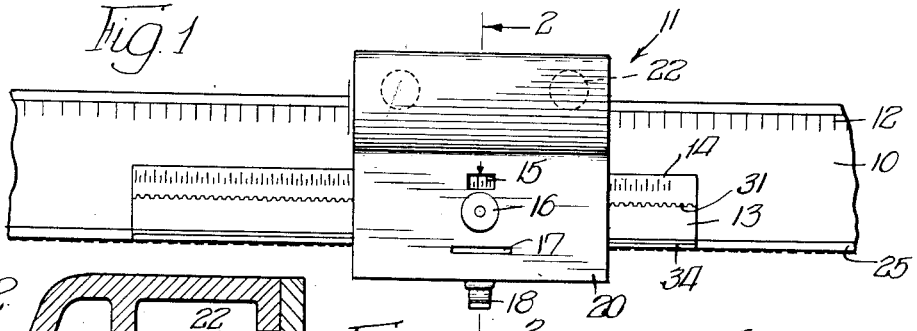
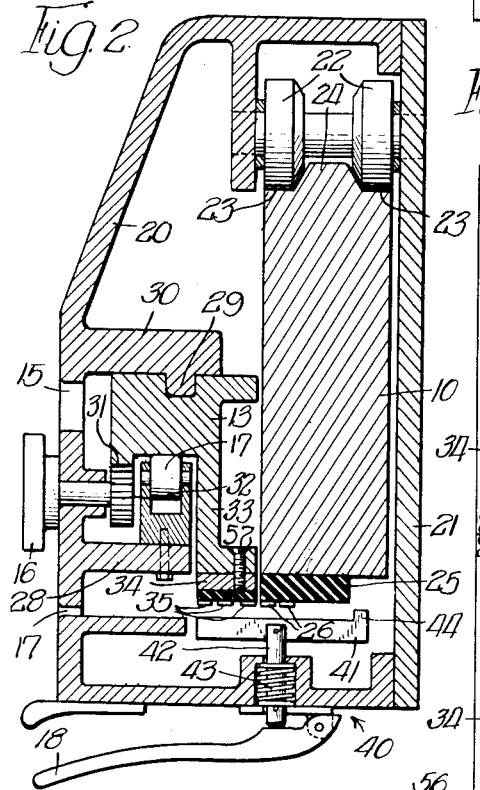
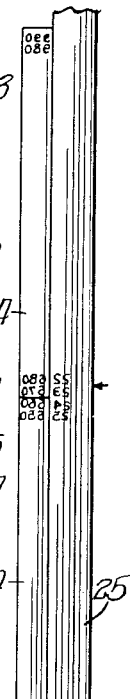
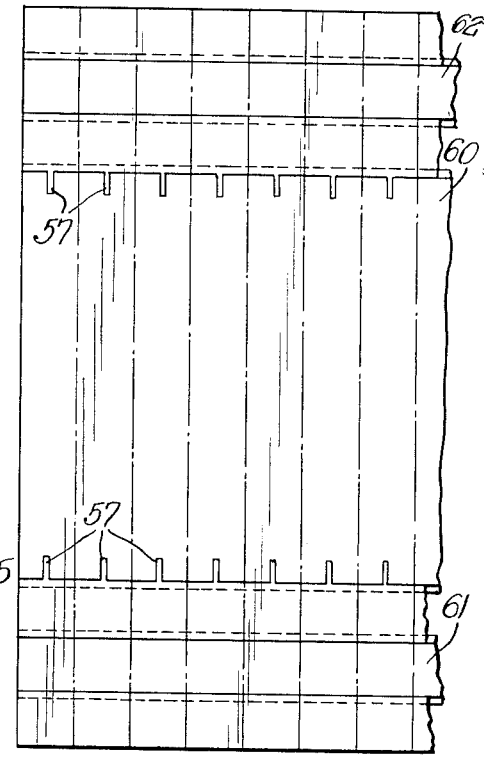
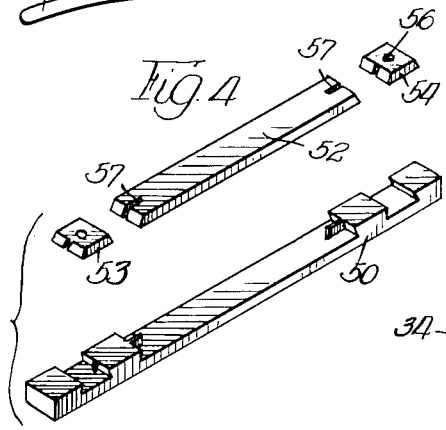
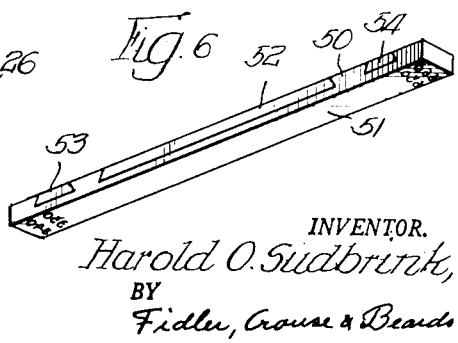
INVENTOR.
Harold O. Sudbrink,
BY
Fidler, Crouse & Beardsley
Attys.

United States Patent Office 2,728,568
Patented Dec. 27, 1955

2,728,568

TYPE BAR

Harold O. Sudbrink, Deerfield, Ill.

Application September 1, 1951, Serial No. 244,846

7 Claims. (Cl. 265—6)

The present invention relates generally to type bars and more particularly to weighted type bars suitable for use in connection with slidable poises for scale beams.

Scale beams comprise generally a weighbar pivotally mounted on a suitable standard about a point near one end of the bar, the bar having its shorter end connected to a load platform through a weight multiplying mechanism and having slidably mounted on its longer end, which will hereinafter be referred to as the beam, a weight known as a poise. The beam is usually notched or otherwise marked at regular intervals along the length thereof, and is so calibrated that when a certain weight is positioned in a particular notch it will exactly balance a certain load placed on the scale platform. It will be evident that a poise, in order to produce the same effect as a weight concentrated in a particular notch, must have a certain total weight and must have its center of gravity at a certain location along the beam with respect to the notch. A change in one will require a corresponding change in the other. Any inaccuracy in either the weight of the poise or the location of its center of gravity will cause a greatly magnified error in the indicated weight of a load placed on the platform. It would, of course, simplify matters if the center of gravity of the poise could be concentrated directly underneath the notch in the beam, but this is not always practical with the present day rather complex poise structures. Such poise structures may include several auxiliary poises, various auxiliary poise adjusting and indicating means, as well as printing means for printing the indicated weight on a ticket.

It is also often desirable to readily modify poise, such as, for example, when the load ratio of the scale is changed to accommodate smaller or larger loads or when a certain standard manufactured poise is to be used with different types of scales. It will be noted that when the poise is modified to be used over a different range this will not only necessitate a change in the total weight of the poise but will also necessitate changing the type bars for printing the indicated weight. Inasmuch as the weight of the type bars enters into the total weight of the poise, as well as the location of the center of gravity thereof, initial balancing of a scale as well as the balancing thereof when the load ratio is changed often requires quite accurate calibration of both the weight and the location of the center of gravity of the particular poise to be used therewith. Particularly in connection with differential heavy duty scales, i. e., scales for weighing a load in terms of the difference between the weight of the carrier without the load and the weight of the carrier with the load, the weight of the poise as well as the location of the center of gravity thereof have to be determined within extremely small tolerances. The calibration of such poises therefore usually entails exacting work by skilled technicians.

In order to simplify the calibrating procedure it has become general practice to use weighted poise type bars having a total weight somewhat larger than that required to bring the weight of the poise up to the required amount in order to make certain that imperfections and non-uniformities in the physical structure of the type bars can be corrected. This correction for non-uniformities in the type bar structure was usually made after the type bars were attached to the poise on the particular scale with which they were to be used, and consisted of removing material from the type bars in a quantity sufficient to bring the total weight of the poise down to the desired total, and at such points along the type bars which would locate the center of gravity thereof correctly.

Some attempts have in the past been made to produce type bars of the predetermined desired weight and having the desired weight distribution, but sufficiently dense materials suitable for being molded to form the type usually developed blowholes or other non-uniformities, and hence the molded type bars had to be calibrated as to weight and weight distribution before they could be used. Alternatively, the type bars were molded from a lightweight material suitable for forming the printing type and providing with a longitudinal recess or channel in the back-face thereof. A weight was then placed within this recess or channel sufficient to bring the total weight of the bar up to the required amount and then the weight was moved along the bar until the desired weight distribution was obtained, i. e., with the center of gravity of the bar and the weight in exactly the right location on the bar. The movable weight was then secured in place on the type bar by peening, swaging or by some other method which would not add to the total weight of the bar and which would not displace the center of gravity thereof. In using the latter method the possibility always existed that the weight might be accidentally displaced during use of the scale and thus the scale would register inaccurate weights until it was subjected to routine tests.

It is the object of the present invention to provide a novel type bar which has none of the drawbacks of the weighted type bars of the prior art.

Another object is to provide a novel and simple weighted type bar which when given certain physical dimensions will have a certain desired weight and weight distribution.

Another object is to provide a novel type bar which will have the desired weight and weight distribution when machined to a predetermined uniform width.

Another object is to provide a novel weighted type bar readily reproducible as to weight and weight distribution.

A more specific object of the invention is to provide a novel type bar having a molded plastic body forming the type face and having a metal weight insert extending from side to side thereof and centered with respect to the length dimension of the bar whereby an accurately balanced type bar having an accurately predetermined weight may be obtained by machining the bar to a uniform predetermined width.

A still more specific object is to provide a novel type bar readily reproducible as to weight and weight distribution comprising a molded plastic body with a metal weight insert centered therein and also provided with metal inserts for mounting the type bar.

A further object of the invention is to provide a novel method for making weighted type bars having predetermined weight and weight distribution.

These and other objects and advantages of the invention will be apparent from the following description taken together with the accompanying drawing wherein:

Fig. 1 shows a side view of a section of the scale beam with a slidable poise mounted thereon;

Fig. 2 is a cross-sectional view of the poise and beam along line 2—2 of Fig. 1;

Fig. 3 is a plan view of a section of the type bar mounted on the beam shown together with a plurality of printing bars placed end to end and mounted on the movable auxiliary poise;

Fig. 4 is an exploded view of the type bar;

Fig. 5 is a plan view of a molded blank for making a plurality of type bars; and Fig. 6 is a perspective view of a complete type bar.

The type bar of the present invention may be used with any kind of scale having a movable poise and having means for printing a record of the weight of a load placed on the scale platform, but in order to render the description of the invention more readily understood, it will be described as applied to a specific type of scale such as that described in U. S. Patent No. 1,829,782 issued to A. Bousfield on November 3, 1931, and reference is made to this patent for a more detailed description of the various parts of the scale.

Referring now specifically to Fig. 1, there is shown therein a portion of a scale beam 10 having mounted thereon a slidable poise generally indicated by reference numeral 11. Such a beam is usually provided with a visual scale 12 for indicating the main units of the weight, and in the present description it will be assumed that the scale 12 shows the weight in thousands of pounds. The beam is preferably provided with notches cooperating with a pawl on the poise to insure that the poise will be positioned exactly in alignment with a particular one of the main weight units. Such centering means is not illustrated in the drawing in order not to unduly complicate it with details, but it may be as described in above-mentioned U. S. patent.

The poise 11 is provided with the usual slidable auxiliary poise 13 which is also provided with a visual scale 14 which may be viewed through a window 15 provided in the poise housing. Scale 14 is divided into units for indicating fractions of the units of scale 12. A manually operable knob 16 is provided for positioning the auxiliary poise with respect to the main poise housing by means of a pinion and rack arrangement. A slot 17 is provided for inserting in the poise housing a printing ticket therethrough and the printing mechanism which will be described later may be actuated by a manipulating lever 18.

As better shown in Fig. 2, the poise housing comprises a front portion 20 and a back portion 21 suitably secured together. In order to suspend the poise on the beam in such a manner as to permit the poise to be moved freely and easily along the beam, there is provided a pair of rollers 22 journalled transversely in the housing near each end thereof. The rollers are arranged to travel along tracks 23 provided on the top of the beam and separated by a guiding central rail 24, and may be of the construction shown in the above identified Bousfield patent. Mounted underneath the beam and extending along the entire usable portion thereof is a type bar 25 having formed thereon type 26 for printing a number in thousands corresponding to the position of the poise with respect to the beam.

The auxiliary poise 13 may be slidably mounted within the front housing portion 20 as shown in Fig. 2 by means of a plurality of rollers 27 suitably mounted on an inwardly projecting shelf 28. The auxiliary poise may be maintained in position by means of a key 29 projecting downwardly from a second inwardly projecting shelf 30 and received by a keyway extending along the entire length of the auxiliary poise. The auxiliary poise is provided with a downwardly extending rack 31 engaged by a pinion 32 which may be rotated in either direction by knob 16. The auxiliary poise is also provided with a portion 33 extending downwardly to a point where its under-surface will be in substantial alignment with the under-surface of the main beam 10. Mounted on the under-surface of the downwardly extending portion 33 is a type bar 34 which forms the subject matter of the present invention. Type bar 34 is provided with type 35 for printing a number corresponding to the position of the auxiliary poise with respect to the main poise and will have the same numerical value as that indicated by visual scale 14.

The printing mechanism is indicated by reference numeral 40 and may comprise a printing platen 41 mounted on a plunger 42 normally biased downwardly toward the position shown by a spring 43. Printing lever 18 is pivotally mounted on the housing portion 20 so that when forced upwardly it will bear against plunger 42 to press platen 41 against the face of type bars 25 and 34. A conventional printing ticket provided with carbon paper is inserted through slot 17 to a position wherein it will abut an upwardly projecting stop 44 on platen 41, and when lever 18 is moved upwardly it will cause type 26 and 35 on type bars 25 and 34, respectively, to cause the weight of a load placed on the scale platform and balanced by the poise and the auxiliary poise to be printed on the ticket. Type 26 will print the weight in thousands in accordance with the position of the poise with respect to beam 10 and type 35 will print the weight in hundreds, tens and units in accordance with the position of auxiliary poise 13 with respect to the poise housing.

In accordance with the present invention there is provided a weighted and pre-balanced type bar 34 which will require no calibration after it has been mounted on the auxiliary poise, but which when made to a certain uniform width dimension will be of exactly the right weight and will have exactly the right weight distribution, usually with the center of gravity in the middle of the bar.

As it was pointed out above, it is absolutely essential that the weighted type bar has the exact required weight and weight distribution in order that a given poise having its auxiliary poise adjusted to its initial or zero position will exactly balance a load corresponding to the weight assigned to the position at which the poise is placed on the beam. If such accurately pre-weighted and pre-balanced weighted type bars are available, standard manufactured poises may be used for various kinds of scales covering different ranges by specifying, for a particular scale, the total length of the type bars to be used, the weight range to be covered thereby, and the exact weight of each bar assuming that the center of gravity is located at the exact center of each type bar. When using the weighted type bars in accordance with the present invention no calibration of the scales will be necessary after having the specified type bars mounted thereon.

A type bar made in accordance with the invention is shown fully assembled in Fig. 6 and comprises, as better shown in the exploded view in Fig. 4, a molded main body portion 50 of a relatively light plastic material suitable for forming printing type, a high density non-corrosive metal insert 52 and on each side of insert 52 lightweight non-corrosive metal mounting inserts 53 and 54, respectively. These inserts may be made from preformed or pre-machined metal stock having the exact required cross-sectional dimensions and should be selected from metals having a high degree of structural uniformity. Thus if the type bar is made somewhat wider than necessary, and if the weighted insert is exactly centered with respect to the length dimension of the bar, the bar may always be made to an exact predetermined required weight by machining the sides of the bar until it has the exact width corresponding to such weight.

Each type bar may be molded separately by placing the heavy metal insert at a predetermined position in a type bar mold with respect to the length dimension thereof whereupon the bar is molded by using a suitable molding material. The metal insert may be made of lead and the molding material may be any material suitable for forming the printing face. The sides of the molded bar are then finished off by machining, for example, until the bar has a predetermined uniform width whereby the bar will have a predetermined weight corresponding to such width and will have its center of gravity at a predetermined location along the length dimension thereof. The heavy metal insert is preferably centered in the type mold so that the finished bar will have its center of gravity at the exact center of the length dimension thereof. The metal inserts for mounting the bar are placed between each end of the heavy metal insert and the ends of the mold and are tapped at the proper location after the type bar is molded.

A convenient method in accordance with the invention for producing type bars in large quantities is to mold a single block as indicated in Fig. 5 which then is cut along the dotted lines to provide a plurality of type bars. A bar 60, Fig. 5, made of the high density metal for forming inserts 52 and having the required cross-section for forming such inserts is positioned in a type bar mold so as to be equidistant from the sides of the mold. Metal bars 61 and 62 having the required cross-section for forming the mounting inserts 53 and 54 are then placed on either side of bar 60. These bars do not have to be molded but can be formed to the required dimensions by any process which will produce a uniform metal structure.

The body portion 50 may be molded from any material such as a thermoplastic material, for example, possessing the characteristics necessary for forming the printing type and should be selected so as to be resistant to the various deleterious substances to which the scale with which the type bars are to be used, may be exposed.

The face of the mold is engraved so that it will form the proper type characters in the proper sequence in the molded product. Thus it may be desirable to provide one mold for molding at once several type bars of a certain range only, or if two or three type bars are to make up a certain range when placed end to end, the mold may be made so as to mold an equal number of bars of each range.

After the composite bar of Fig. 5 has been molded and has been permitted to set properly, it is cut along the dotted lines to form the unfinished individual type bars. Only the side faces need to be finished, as the other faces are finished by the molding process. Due to the accurate centering of the inserts in the mold and the uniformity of the material therein, each type bar will be perfectly balanced about a point midway between its ends when the sides are finished off parallel with each other no matter what the width may be. Furthermore, due to the uniformity of the materials used, bars finished to a certain width will always weigh exactly the same. Thus if a certain scale requires type bars of a certain weight, it is merely necessary to finish off the sides thereof to the width dimension corresponding to such weight.

A finished type bar is shown in Fig. 6. This particular type bar has a range from 340 to 660 and thus is designed to be used together with a type bar having a range from 0 to 330 and with one having a range of from 670 to 990. The mounting inserts 53 and 54 on either side of insert 52 are provided with tapped mounting holes 56 for securing the type bar to the underside of auxiliary poise 13, Fig. 2, by means of mounting screws 57 extending through holes properly positioned in the mounting rim of the auxiliary poise.

If the scale is designed so that the auxiliary poise is movable through a range corresponding to the length of three type bars, three type bars having type thereon covering the ranges of 0 to 330, 340 to 660, and 670 to 990, respectively, are mounted end to end in the proper sequence. Each bar is finished off to the exact width to provide the correct weight and each will have its center of gravity at the exact center of the bar so that the resultant center of gravity of the three type bars will be in the exact center of the total range of movement of the auxiliary poise.

The mounting holes for the type bars are so positioned that the type bars will be in a position to print "000" when the auxiliary poise is placed in its zero position, i. e., the position wherein it will be closest to the pivot point of the weighbar.

It will be noted that in order to prevent the inserts from separating from the molded main body 50, they are provided with slanting end surfaces which will extend longitudinally into the molded plastic body. The inserts are further provided with saw cuts 57 in the end faces of the inserts. The plastic material will extend into these saw cuts to prevent any lateral movements of the inserts with respect to the plastic body. Other means for securing the inserts in the plastic body may of course be provided, but care should, of course, be taken that equal amounts of material are added to or removed from the ends of the inserts in order not to upset the weight symmetry thereof.

In order to illustrate the use of the type bars it will be assumed that they are used with scales wherein the notches for positioning the poise are spaced apart by a distance corresponding to a thousand pounds. The total range of movement of the auxiliary poise will then have to cover from "0" to "999" pounds spaced at equal intervals. In the present illustration three weighted type bars are placed end to end and cover ranges of 0 to 330, 340 to 660, and 670 to 990, respectively, as indicated in Fig. 3.

Suppose that the weight of a load placed on the platform is equal to 22,680 lbs. First the auxiliary poise is zeroed, i. e., placed in the position wherein it will be closest to the fulcrum of the weighbar wherein the type for printing "000" will be directly above platen 41 and this number will also appear in window 15. The poise is now slid along the beam. It will be found that when the poise is positioned in the 22,000 lb. notch it will not quite be sufficient to balance the load but that when the poise is placed in the 23,000 lb. notch it will be a little too heavy. Hence the poise is placed in the 22,000 lb. notch. The platen 41 on the poise will then be directly underneath the type of beam type bar 25 which will print the number 22.

The auxiliary poise 13 is now moved along the beam by turning knob 16 until the load is just balanced. The type for printing the number 680 will now be placed directly above platen 41 and when a ticket is inserted in slot 17 between the platen and the type bars, the number 22,680 will be printed thereon when lever 18 is pressed upwardly.

It will be evident that if several auxiliary poises are used so that one will adjust for the hundreds, another for tens and so forth, type bars in accordance with the present invention may be used with each one of them.

It will be obvious from the above that the invention is not limited to the specific illustrative embodiment described herein but that various modifications may be made therein without departing from the true scope and spirit of the invention.

I claim:

1. An elongated weighted type bar comprising a main molded body portion of a low density material forming the printing face and the ends of the bar, and a high density metal insert in said body portion shorter than said body portion and extending from side to side of the bar and having the ends thereof spaced from the molded ends of the bar, said metal insert being so disposed within said body portion as to cause the center of gravity of the bar to be at a predetermined location along the length dimension thereof when the sides of the bar are faced off to render the cross section of the bar uniform along its entire length.

2. An elongated weighted type bar comprising a main molded body portion of plastic material forming the printing face of the bar, a heavy metal insert in said body portion shorter than said body portion and extending from side to side of the bar and centered with respect to the length dimension of the bar, and a metal mounting insert in said body portion between each end of the heavy metal insert and the respective end of the bar.

3. An elongated weighted type bar comprising a main molded body portion forming the printing face of said bar, a metal insert in said body portion of high density with respect to the density of said molded body portion and extending partially toward the ends and from side to side of said bar and centered with respect to the length dimension of said bar, said bar having a uniform cross section at least throughout the length of said insert whereby the center of gravity of said bar will be located at the midpoint between the ends thereof.

4. A pre-weighted and pre-balanced type bar comprising a main molded body portion forming the printing face of the bar, and a metal insert of high density with respect to the density of said body portion, said insert extending from side to side of said bar and being shorter than the total length of the bar and positioned equidistant from the ends of the bar, said insert having integral projections extending longitudinally into the molded body portion to form a rigid construction.

5. A pre-weighted and pre-balanced type bar comprising a main molded body portion forming the printing face and the ends of the bar, and a uniform metal insert centered in said body with respect to the length dimension thereof, said insert being of high density with respect to the density of said body portion and having slanting end surfaces extending longitudinally into the molded body and having a saw cut formed in the respective end portions of said insert for receiving molded material.

6. An elongated weighted type bar comprising a main molded body portion forming the printing face thereof, a metal insert of high density with respect to the density of said molded body portion, said insert being shorter than the total length of the type bar and positioned equidistant from the ends of the bar and extending from side to side of the bar throughout the entire length of said insert, whereby, when the bar is machined to a predetermined width throughout the length of said insert said bar will have a certain predetermined weight determined by the density of said insert and of the material of said body portion and will have its center of gravity at the exact midpoint between its ends.

7. A pre-weighted and pre-balanced type bar comprising a main body portion molded from a plastic material forming the printing face and the ends of the bar, a balancing insert of a uniform thickness in said body portion and extending from side to side of said bar and having the ends thereof equidistantly spaced from the respective ends of the bar, said insert being of high density with respect to the density of said body portion, and a mounting insert in said body portion at either end of said balancing insert, said inserts having slanting end surfaces extending substantially longitudinally into said molded body portion and having lateral saw cuts formed in the ends of the inserts to securely anchor said inserts in said molded body portion.

References Cited in the file of this patent

UNITED STATES PATENTS

| | | |
|---|---|---|
| 880,225 | Lamb | Feb. 25, 1908 |
| 1,442,136 | Rousseau | July 11, 1922 |
| 1,443,928 | Putnam | Jan. 30, 1923 |
| 1,810,088 | Schmutz | June 16, 1931 |
| 2,020,982 | Williams | Nov. 12, 1935 |
| 2,071,406 | Jerome | Feb. 23, 1937 |
| 2,143,833 | Moss | Jan. 10, 1939 |
| 2,188,261 | Basquin | Jan. 23, 1940 |
| 2,323,752 | Howey | July 6, 1943 |
| 2,348,944 | White | May 16, 1944 |